United States Patent [19]

Carpio et al.

[11] Patent Number: 5,030,527

[45] Date of Patent: Jul. 9, 1991

[54] RADIATION CURED SOLID AQUEOUS ELECTROLYTES AND ELECTROCHEMICAL DEVICES EMPLOYING THE SAME

[75] Inventors: Ronald A. Carpio; Denis G. Fauteux, both of Centerville, Ohio

[73] Assignee: Ultracell Incorporated, San Jose, Calif.

[21] Appl. No.: 462,167

[22] Filed: Jan. 8, 1990

[51] Int. Cl.$^5$ ........................................... H01M 10/40
[52] U.S. Cl. ................................... 429/192; 252/62.2; 29/623.5
[58] Field of Search .................. 429/190, 192, 195; 252/62.2; 29/623.5

[56] References Cited

U.S. PATENT DOCUMENTS

| | | | |
|---|---|---|---|
| 3,871,918 | 3/1975 | Viescou | 429/190 |
| 4,218,280 | 8/1980 | Philipp et al. | 156/272 |
| 4,262,067 | 4/1981 | Philipp et al. | 429/139 |
| 4,792,504 | 12/1988 | Schwab et al. | 429/192 |
| 4,797,190 | 1/1989 | Peck | 429/190 X |
| 4,834,772 | 5/1989 | Dixon et al. | 429/190 X |

FOREIGN PATENT DOCUMENTS 55-105969 8/1980 Japan.
56-116274 9/1981 Japan.

OTHER PUBLICATIONS

Ward, *Chemical Abstracts*, vol. 88, No. 153544, 1978.

*Primary Examiner*—Stephen J. Kalafut
*Attorney, Agent, or Firm*—Richard L. Neeley

[57] ABSTRACT

A solid aqueous electrolyte for use in an electrochemical device produced by the process comprising the steps of:

forming a homogeneous mixture of an ionically conductive material, water and a radiation curable material, said radiation curable material being capable of crosslinking upon exposure to radition or heat; and subjecting said mixture to ionizing radiation or heat to thereby crosslink said curable material and an electrochemical cell including the electrolyte are disclosed.

33 Claims, No Drawings

RADIATION CURED SOLID AQUEOUS ELECTROLYTES AND ELECTROCHEMICAL DEVICES EMPLOYING THE SAME

BACKGROUND OF THE INVENTION

1. Field of the Invention

The present invention relates to the manufacture of aqueous electrochemical devices, and more particularly, electrochemical devices in which the aqueous based electrolyte is maintained in a solid form.

2. Description of the Prior Art

Electrochemical devices having aqueous electrolytes are well known in the art. Examples of such cells include traditional LeClanche cells, Ni-Cd, Ni-Zn, Zn-$MnO_2$, Ni-$H_2$ and Pb-acid cells. These cells typically include an anode material a cathode material, a liquid aqueous electrolyte material and a solid separator. In a typical configuration, the separator is located between the anode and the cathode within the electrolyte. The separator, which is solid in nature, functions to prevent spontaneous discharge by providing a barrier against direct contact of the anode material with the cathode material. The separator can also impede the transport of active materials between the electrodes to prevent dendrite formation in the case of secondary batteries.

Because of the liquid nature of the electrolyte material, it is necessary to maintain the separator in solid form. Examples of materials useful as separators include cotton, nylon, polypropylene, cellulose rayon paper, cellulose nylon paper, polyethylene, polyvinylchloride, polytetrafluoroethylene, polysulfone, cellophane, and the like. These materials are typically maintained in a woven or non-woven membrane form. The inclusion of the separator in the cells, while necessary, is problematical in that it may not be chemically compatible with the liquid electrolyte thereby reducing battery life, may increase the impedance of the cell or may be complex and costly to manufacture. Accordingly, attempts are being made in the art to try to improve the performance of the separator material and the separator/electrolyte element.

For example, U.S. Pat. Nos. 4,262,067 and 4,218,280, assigned to United States of America (NASA), disclose battery separator membranes which are crosslinked. More particularly, an aqueous solution of a film-forming material, such as polyvinyl alcohol is admixed with a crosslinking agent having a basic pH, the admixture is formed into a desired physical shape by casting and the like, the sheet is dried to form a self-supporting film and is immersed in an aqueous acid solution to effectuate crosslinking. After crosslinking, the completed separator material is immersed in an electrolyte solution including a conductive compound such as KOH. Although this type of separator has advanced separator properties, after the immersion of the separator into the KOH solution, the resulting material is a multi-phase material (i.e. a liquid supported in a solid matrix). This separator is potentially difficult to fabricate.

Japanese published application numbers 56-116274 and 55-105969 both disclose separators for use in alkaline electrochemical cells wherein radiation curing is utilized to form the separator. Following curing, the separator is immersed in a liquid electrolyte material to produce a multiphased electrolyte/separator material.

In the field of solid state alkali metal anode cells having non-aqueous electrolytes, cells have been produced without requiring the presence of an independent separator. More particularly, these cells utilize a solid electrolyte which is interposed between an anode layer and a cathode layer. Due to the solid nature of the electrolyte, it serves the dual function of being an electrolyte and a separator. Examples of such cells are disclosed in U.S. Pat. No. 4,792,504, assigned to MHB Joint Venture.

So called gelled electrolytes may be utilized in association with alkaline batteries or lead acid batteries. These materials are particularly used in alkaline batteries to reduce electrolyte dissolution and in lead acid batteries for reducing self discharge. Example of suitable gelled electrolydes are disclosed in the following references. Manufacture of Laminar Battery, Hino, Yoshihisa,; Takayanagi, Hiroyuki; Yoshioka, Michie; Jpn. Kokai Tokkyo Koho JP 61-93,544 [86-93,554] 12 May 1986; Dry-Cell Batteries, Shinoda, Kenichi; Ota, Hirokiko; Takeshima, Takaoki; Kinoshita, Masaaki; Watanabe, Nobuaki; Jpn. Kokai Tokkyo Koho JP 62-164,558 [87-154,558] 09 Jul 1987; Hydrogen Battery Anodes. Mitsuyasu, Kiyoshi; Tsuruta, Shinji; Sato, Yuji; Kanda. Motoi; Yagasaki, Eriko; Jpn. Kokai Tokkyo Koho JP 62-265,556 [87-264,556] 17 Nov. 1987; Gelled Electrolytes for Lead-Acid Batteries. Morita, Yoshishige; Jpn. Kokai Tokkyo Koho JP 62-264,571 [87-264,571] 17 Nov. 1987; Sealed Lead-Acid Batteries with Polymer-Covered Cathodes Inoe, Toshihiro; Matsuo, Kojira; Jpn. Kokai Tokkyo Koho JP 63-126,174 [88-126,174] 30 May 1988; and Lead-Acid Batteries with Gelled Electrolytes, Takahashi, Wataru; Kamiharashi, Seiji; Jpn. Kokai Tokkyo Koho JP 63-152,881 [88-152,881] 25 Jun 1988.

To date, electrochemical cells having aqueous electrolytes have required the presence of an independent separator material. Accordingly, there exists a need in the art for developing electrochemical cells containing aqueous electrolytes wherein the cells do not require the presence of an independent separator material.

SUMMARY OF THE INVENTION

In accordance with the present invention, electrochemical devices employing aqueous electrolytes which are solid in nature are provided. Because the electrolytes are solid the cells do not require a separate separator for operability. Moreover, because the electrolyte is solid it is possible to produce a laminar solid state aqueous electrolyte cell which includes only an anode layer, electrolyte layer and cathode layer. The solid state laminar form enables highly efficient cells having optimized surface area per volume characteristics to be produced.

To produce the electrolyte of the present invention, a homogeneous mixture is formed by mixing together water, the active electrolyte compound, an initiator in some cases and a material which is capable of crosslinking upon exposure to ionizing radiation or heat; i.e., an oligomer or monomer suitable for free radical polymerization. The homogeneous single phase material is then cured by exposure to radiation. The resultant material comprises a solid material including the active ionically conductive electrolyte material. Because the electrolyte is dimensionally stable, the electrolyte material may be interposed between an anode layer and a cathode layer to produce a solid state electrochemical device which includes an aqueous electrolyte, but does not include a separate solid separator.

In accordance with one embodiment of the present invention, a solid aqueous electrolyte for use in an electrochemical device is provided. The electrolyte is produced by the process comprising the steps of:

forming a homogeneous mixture of an ionically conductive material, water and a radiation curable material, said radiation curable material being capable of crosslinking upon or exposure to ionizing radiation or heat; and subjecting said homogeneous mixture to ionizing radiation or heat to thereby crosslink said radiation curable material.

In a preferred embodiment, the ionically conductive material comprises KOH, and the electrolyte is used in an alkaline battery. However, it is envisioned that other ionically conductive materials may be selected for use in association with specific types of cells. For example, for acidic electrolyte batteries, $H_2SO_4$ comprises the ionically conducting material. In addition, in a preferred embodiment, the crosslinkable material comprises radiation curable polycarboxylic acids and such as polyacrylic acid or radiation curable polyvinyl alcohol.

The chief requirement of the curable material is that it be miscible with the aqueous ionically conductive material and water prior to cure. Prior to cure, the resultant material is considered to be a homogeneous mixture.

In one embodiment, the preferred means for curing comprises exposing the electrolyte to electron beam radiation. However, other radiation wavelength bands, such as ultraviolet waves and heat waves may be selected.

In accordance with another embodiment of the present invention, a laminar solid state aqueous electrolyte electrochemical cell is provided. The cell includes an anode layer, a cathode layer, and the above defined aqueous electrolyte layer interposed between the anode layer and the cathode layer. As long as the electrolyte layer does not contain any active anode or cathode materials the cell will operate without the risk of spontaneous discharge.

In a preferred embodiment, the electrochemical cell is a zinc/$MnO_2$ alkaline cell, but the types of other cells which include aqueous electrolytes may be selected. Examples of such cells include lead acid cells, Ni-$H_2$ cells, and Ni-Cd cells. The second preferred embodiment is a Pb/$PbO_2$ battery.

By forming the electrochemical cell from laminar components, an optimized surface area per component layer volume is provided. As a result, the electronic and ionic efficiency of the cell is greatly improved enabling the power of the cell to be significantly higher as compared to identically sized prior art cells.

In still another embodiment of the present invention, a process for producing a solid state laminar electrochemical cell having an aqueous electrolyte is provided. The process comprises the steps of:

coating an aqueous electrolyte composition comprising a homogeneous mixture of an ionically conductive material, water and a radiation curable material onto an anode composition, said radiation curable material being capable of crosslinking upon exposure to ionizing radiation or heat;

coating a cathode composition onto said electrolyte composition to form a cell assembly; and subjecting said cell assembly to ionizing radiation or heat to crosslink said radiation curable material.

This process enables a thin layer aqueous electrolyte laminar cell to be produced without requiring the cell to have an independent separator.

Accordingly, it is an object of the present invention to provide a solid electrolyte including an ionically conductive material and water.

It is a further object of the present invention to provide a laminar solid state aqueous electrolyte electrochemical cell which does not include an independent separator.

These, as well as other objects will be readily understood as reference is made to the following drawings and detailed description of the preferred embodiment.

DETAILED DESCRIPTION OF THE PREFERRED EMBODIMENT

While describing the preferred embodiment, certain terminology will be utilized for the sake of clarity. It is intended that such terminology include not only the recited embodiment, but all technical equivalents which perform substantially the same function, in substantially the same way to achieve substantially the same result.

The present invention provides a solid aqueous electrolyte. The electrolyte is produced by forming a homogeneous mixture of an ionically conductive material, water, a radiation curable material and an initiator if UV radiation or heat are employed. The mixture is then exposed to ionizing radiation or heat to crosslink the curable material and form a solid, and particularly an amorphous solid resultant material. It is particularly important that the materials be soluble and/or miscible with each other to form a homogeneous mixture. Accordingly, those skilled in the art will recognize that each ionically conductive material selected must be soluble in or miscible with the chemically or radiation curable material selected.

For use as the ionically conductive material, acid or base materials or neutral salts currently commercially used as electrolytes may be selected. These materials include KOH (typically used in primary alkaline, Ni-$H_2$ or Ni-Cd cells), $H_2SO_4$ (typically used in lead-acid cells), quaternary electrolytes such as tetramethyl ammonium hydroxide, and aqueous $ZnCl_2$ and $NH_4Cl$ (typically used in the LeClanche cell). Other materials include NaOH, LiOH quaternary ammonium hydroxide, $H_3PO_4$, $HNO_3$ and $HClO_4$.

For use as the radiation curable material, any material which can be cured upon exposure to ionizing radiation and can form a homogeneous mixture with the aqueous ionically conductive material and water may be selected. In general, such materials undergo free radical polymerization by a chain reaction mechanism. Examples of suitable radiation curable materials include polycarboxylic acids such as acrylic acid and acrylate materials, polymeric alcohol materials, epoxy materials, polymeric imine materials and urethane materials.

The preferred radiation curable polymers for alkaline batteries are polycarboxylic acids such as poly(acrylic acid). The carboxylic acid groups of the polycarboxylic acid should be attached to the organic polymer chain or the polycarboxylic acid component can also be a graft or block copolymer. The polycarboxylic acid can be obtained by homopolymerizing monomeric unsaturated carboxylic acids such as acrylic acid, methacrylic acid, ethacrylic acid, alpha-chloroacrylic acid, and the like. The polyacrylic acid polymer chain can be contained in a polymer such as those made from styrene and acrylic acid by adjusting the ratios of the comonomers during polymerization to produce a polymer with a polycarboxylic acid polymer chain which is joined to a portion of the polymer composed largely or solely of polystryrene. The polycarboxylic acids can be prepared by copolymerizing a monocarboxylic acid of the acrylic series with polymerizable vinyl or vinylidene compounds such as styrene, vinyl toluene, vinyl benzoate, vinyl chloride, isobutylene, methacrolein, vinyl acetate, and the like. Polycarboxylic acids can also be prepared by carboxyalkylation of polymers containing a multiplicity of hydroxyl groups such as polyvinyl alcohol, partially hydrolyzed polyvinyl acetate, and the like. Carboxyalkylation can be accomplished by established methods such as by reaction with chloracetric acid in the presence of alkali, or by reaction of acrylonitrile in the presence of an alkaline catalyst followed by subsequent hydrolysis of the nitrile group. Each polycarboxylic acid derivative must be tested to establish whether it can be made to undergo radiation induced crosslinking by a chain reaction mechanism.

The acrylate materials which are disclosed in U.S. Pat. No. 4,830,939 may also be selected. To the extent necessary, the teachings of this patent are hereby incorporated by reference.

Other preferred radiation curable oligomers or monomers for alkaline battery applications contain acidic moieties. These include phenol and sulfonic acid derivatives. An example of the former is 4-hydroxystyrene and of the latter is $CH_2=CHCOOCH_2CH_2CH_2SO_3H$.

Examples of radiation curable polymeric alcohols include polyvinyl alcohol and polyethylene glycol and carboxylate derivatives thereof. The latter alcohol polymers may be used in basic solutions, whereas pure polyvinyl alcohol can only be used in association with acidic solutions (e.g. polyvinyl alcohol can be used in combination with an acidic ionically conductive material such as $H_2SO_4$ but not in combination with a basic aqueous ionically conductive material such as KOH).

Examples of radiation curable epoxy materials include mono and difunctional acrylic epoxies such as Henkel Photomer 3038.

Examples of radiation curable polymeric imine materials include polyethyleneimine. This material works best when used in association with an acidic aqueous ionically conductive material.

Examples of radiation curable urethane materials include difunctional acrylic urethanes such as Henkel Photomer 6140 or trifunctional acrylic urethanes.

The third component of the homogeneous mixture is water. In practice, the weight ratio of the components is approximately 5 to 15 parts ionically conductive material, 10 to 25 parts radiation curable material and the balance water. The respective amounts are optimized to produce a mixture having maximum ionic conductively and maximum chemical stability.

In addition to the above three components, other materials may be added to the mixture as necessary. For example, if the mixture is to be cured by exposure to ultraviolet radiation, an ultraviolet initiator may be added in relatively minute amounts, typically 0.1 to 0.5% be weight. Similarly, if heat is used to cure the mixture, a thermal initiator may be added to the mixture. Examples of water soluble initiators include potassium persulfate, $K_2S_2O_8$ and several azo compounds available from Wako Chemicals USA, Dallas, Texas, such as V-50, VA-044 and VA-088. Other additive materials will be appreciated by those skilled in the art.

Once the homogeneous mixture has been formed, the mixture is exposed to ionizing radiation or heat to cure the radiation curable material. For a preferred embodiment the radiation selected may comprise any suitable wavelength and intensity of the electromagnetic spectrum, but in practice X-ray, gamma, visible, ultraviolet, electron beam and heat waves are preferred. The radiation dosage is selected such that the curable material completely crosslinks upon exposure. For example, utilizing an electron beam radiation source delivering a dosage of about 14 Mrads produces a desirable final product.

The produced electrolyte may be used for a variety of practical applications such as use in capacitors, sensors electrochemical cells, and the like. In a particularly preferred embodiment, the electrolyte is used in combination with an anode layer and a cathode layer to form a highly efficient laminar aqueous electrolyte solid state electrochemical cell.

To produce an aqueous electrolyte solid state electrochemical cell, an anode layer including an active anode material must be provided. The active anode material is typically an electrically conductive metal foil member, or a substrate having an electrically conductive metal deposited on its surface through electrodeposition or other means. Examples of commercially available anode materials include zinc or cadmium (for use in alkaline cells), lead (for use in lead-acid cells), and amorphous hydrogen absorbing alloys such as $LuNi_{4.7}Al_{0.3}$ (for use in Ni-$H_2$ cells).

To further improve the electronic and ionic efficiency of the anode layer, it is preferred that the anode layer be formed as a composite anode layer by including an amount of the electrolyte of the present invention and an inert electrically conductive material (e.g. carbon) in addition to the active anode material. The electrolyte of the present invention and electrically conductive material can either be admixed with the active anode layer or can be directly coated onto the substrate including the active anode material and subsequently cured to crosslink the curable material of the electrolyte. When coating the electrolyte material onto the substrate including the active anode material, any coating technique may be selected. Examples of suitable techniques include rod coating, roll coating, blade coating, etc. After curing, the substrate including the active anode material emerges with the aqueous ion conductive network adhered to its surface. This not only provides intimate contact between the anode support and the electrolyte, but it also protects the underlying anode support surface from damage during subsequent manufacturing operations in which it is assembled with the cathode layer.

For use as a composite cathode layer, a substrate including an active cathode material or formed from an active cathode material is provided. The active cathode material typically includes both an ionically conductive material as well as an electrically conductive material. Ionically conductive materials used as active cathode elements are known in the art. Examples include $MnO_2$ (for use in alkaline cells), $PbO_2$ (for use in lead-acid cells), NiOH (for Ni-$H_2$ cells) and CdO (for Ni-Cd cells). Examples of electrically conductive additives include graphite, carbon black, and polymers such as polypyrol and polyacetylene. Electrodeposited cathodes such as $MnO_2$ deposited on stainless steel foil or $PbO_2$ electroformed on Ni foil may also be utilized.

As is the case with the anode layer, to improve the ionic and electronic efficiency of the composite cathode layer the electrolyte of the present invention may be directly added to the active cathode material or coated onto a substrate including the active cathode material. In practice, a particularly advantageous cathode layer may be produced by forming an admixture of active cathode material and electrolyte, and then chemically reacting or exposing the mixture to ionizing radiation or heat to cure the mixture.

To produce a completed electrochemical laminar cell, the electrolyte of the present invention is interposed between a cathode layer and an anode layer, and the entire assembly is exposed to ionizing radiation or heat to cure the electrolyte. In a particularly preferred embodiment the anode element layer and the cathode element layer each additionally includes an amount of the electrolyte of the present invention.

To produce this cell, an anode layer is first coated. In practice, the thickness of the anode layer, including optional electrolyte and electrically conductive material ranges from about 25 to about 200 microns. It is imperative that this anode layer is very flat and free of protuberances which could short the anode layer to the cathode layer through the electrolyte. Note in some cases the anode layer will be a metal foil, so this coating step will be unnecessary. Thereafter, the electrolyte of the present invention is coated onto the anode layer. Again, the coating liquid is of relatively high viscosity such that the active anode material cannot protrude through the electrolyte layer. The thickness of the electrolyte layer may be relatively thin, the primary consideration being that the upper surface of the electrolyte not include any active anode material. The thickness of the electrolyte layer ranges from about 25 microns to about 200 microns. To maximize energy density of the cell, the electrolyte thickness should be minimized. The minimum thickness will be limited by the requirements of the electrolyte to prevent shorting in addition to the requirement of the electrolyte serving as a reservoir for the metal cations produced during discharge.

After the electrolyte layer has been coated onto the anode layer, the cathode layer, optionally including additional electrolyte material, is coated onto the electrolyte layer. Due to the viscosity of the electrolyte layer, active cathode material does not protrude through the upper surface of the electrolyte layer upon coating, thereby preventing the active anode material from directly contacting the active cathode material. In an embodiment where the cathode layer comprises a mixture of active cathode material and electrolyte material, the cathode layer is coated as a highly viscous liquid. In practice, the thickness of the cathode layer typically ranges from about 75 microns to about 200 microns.

After the three layers have been coated to form an assembly, the entire assembly is then exposed to ionizing radiation or heat to crosslink the electrolyte. Alternatively, each of the component layers may be individually prepared and then adhered together by means of heat, pressure, and the like. However, it has been discovered that superior adherence between the component layers is obtained by using a post assembly curing step, as the electrolyte material, in addition to providing ionic conductivity, aids in adhering the layers together.

To further aid in electrical conductivity, the cathode element layer can be coated onto a current collector such that the current collector is located at the cathode surface opposite the electrolyte layer. Current collector materials are well known in the art and include solid and porous materials. Materials which may be utilized as a current collector include carbon, copper, aluminum, nickel, steel, lead and iron and combinations thereof. Polymeric substrates which are heavily loaded with electrically conductive additives such as carbon may also be utilized. In practice, the thickness of the current collector typically ranges from about 5 microns to about 25 microns.

Further, as will be appreciated, other arrangements may be utilized for producing a cell. For example, instead of forming the cell by first coating the electrolyte layer onto the anode layer and then coating the cathode layer onto the electrolyte layer, the reverse coating sequence may be utilized.

In addition, other processing steps may be utilized to improve the overall ionic and electronic efficiency of the cell. For example, any of the component layers may be pressure rolled to improve contact between the active anode or cathode material and the electrolyte layer. Examples of pressure rolling laminar cell layers to improve adherence and electrical and ionic efficiency are disclosed in U.S. patent application Ser. No. 343,976, filed Apr. 25, 1989; the teachings of which are hereby incorporated by reference. Further, the use of multiple exposure steps to improve adherence between the components layers may be performed. For example, a first exposure step may be performed after coating the electrolyte onto the anode layer while a second exposure step may be performed after coating the cathode layer onto the electrolyte layer. This technique is also disclosed in U.S. patent application Ser. No. 343,976.

The above method may also be used to produce hybrid batteries which include both basic and acidic regions because these components are largely immobilized in the solid matrix after curing. Such a battery would include a zinc anode, a basic electrolyte, an acidic electrolyte and a $PbO_2$ cathode. Operation of this type of cell is by proton conduction.

The invention is further explained in the following non-limiting examples.

EXAMPLE 1

To produce a solid state alkaline battery including KOH as an electrolyte active material the following procedure was utilized. A cathode composition including 33.3 parts $MnO_2$, 16.7 parts carbon, 5.55 parts KOH, 11.1 parts polyacrylic acid (MW=150,000) and 33.3 parts water having a thickness of 75 microns was coated onto a nickel current collector having a thickness of about 10 microns. The cathode composition was cured by exposure to an electron beam at a setting of 2 mA and a voltage of 175 KeV (dosage =7.2 Mrads). An electrolyte layer having a thickness of about 50 microns, a viscosity of about 3500 cp at 30° C. including 22.2 parts polyacrylic acid (MW =150,000), 11.1 parts KOH and 66.7 parts water was coated onto the cathode composition layer and the assembly was then cured at a dosage of 7.2 Mrads to solidify the electrolyte layer to a gel-like, tacky state. A 3.5 by 3.5 centimeter polypropylene mask was interposed onto the electrolyte layer and a zinc anode having a thickness of about 50 to 100 microns and dimensions of 4 cm by 4 cm was overcoated onto the electrolyte layer. The electrolyte layer had enough strength to adhere the zinc anode to the remainder of the cell. The impedance of the cell at 65 Khz was 0.22 ohms while the impedance at 1.04 Hz was 37.8 ohms and the conductivity of the cured electrolyte was $1.4 \times 10^{-2}$/ohm.cm at 22° C.

EXAMPLE 2

The procedure of Example 1 was repeated with the exception that the electrolyte contained 12.5 parts of polyacrylic acid (MW=150,000), 9.7 parts of polyacrylic acid (MW=25,000), 11.1 parts of KOH and 66.7 parts of $H_2O$ and the cathode contained 40.91 parts $MnO_2$, 9.09 parts carbon, 5.55 parts KOH, 11.1 parts of the above described electrolyte and 33.3 parts $H_2O$. The impedance of the cell at 65 Khz was 0.34 ohms and the impedance of the cell at 1.04 Hz was 51.2 ohms.

EXAMPLE 3

For use in a lead-acid battery, an electrolyte coating formulation containing 9.1 parts polyvinyl alcohol, 9.1 parts $H_2SO_4$ and 81.8 parts $H_2O$ were mixed together. The polyvinyl alcohol was crosslinked by exposure to an electron beam at a current setting of 1 mA and a voltage of 170 KeV. The room temperature conductivity of the resulting film was about $10^{-3}$ (ohm-cm)$^{-1}$. This electrolyte was interposed between a cathode layer comprising $PbO_2$ electrodeposited on a metal foil and an anode layer comprising a lead foil. It was possible to recharge the battery to 2 volts.

Having described the invention in detail and by reference to preferred embodiments thereof, it will be apparent that modifications and variations are possible without departing from the scope of invention defined in the appended claims.

What is claimed is:

1. A solid aqueous electrolyte for use in an electrochemical device produced by the process comprising the steps of:

forming a mixture of an aqueous ionically conductive material, water and a chemically or radiation curable material, said chemically or radiation curable material being capable of crosslinking upon exposure to ionizing radiation or heat; and subjecting said mixture to ionizing radiation or heat to thereby crosslink said curable material;

wherein said ionically conductive material is an acid or a neutral salt.

2. The electrolyte according to claim 1 wherein said ionically conductive material is $NH_4Cl$.

3. The electrolyte according to claim 1 wherein said ionically conductive material is an acid selected from the group consisting of $H_2SO_4$, $H_3PO_4$, $HNO_3$ and $HClO_4$.

4. The electrolyte according to claim 1 wherein said curable material is selected from the group consisting of polycarboxylic acids, polyvinyl alcohol, poly(ethylene glycol), acrylated epoxy materials, polyethyleneimine, acrylated urethane materials and derivatives and copolymers thereof.

5. The electrolyte according to claim 4 wherein said radiation curable material comprises polyacrylic acid.

6. The electrolyte according to claim 4 wherein said radiation comprises gamma, visible, x-ray, ultraviolet or electron beam radiation.

7. The electrolyte according to claim 4 wherein said radiation comprises heat.

8. The electrolyte according to claim 4 wherein said radiation curable material comprises at least 10% by weight of said mixture.

9. A laminar solid state aqueous electrolyte electrochemical cell comprising:

an anode layer;

a cathode layer; and an aqueous electrolyte layer interposed between said anode layer and said cathode layer;

said aqueous electrolyte layer being produced by the process comprising the steps of:

forming a homogeneous mixture of an ionically conductive material, water and a radiation curable material, upon exposure to ionizing radiation or heat; and subjecting said homogeneous mixture to ionizing radiation or heat to thereby crosslink said curable material;

wherein said ionically conductive material is an acid or a neutral salt.

10. The electrochemical cell according to claim 9 wherein said ionically conductive material is an acid selected from the group consisting of $H_2SO_4$, HCl, $H_3PO_4$, $HNO_3$, and $HClO_4$.

11. The electrochemical cell according to claim 9 wherein said ionically conductive material is $NH_4Cl$.

12. The electrochemical cell according to claim 9 wherein said curable material is radiation curable and selected from the group consisting of polycarboxylic acids, polyvinyl alcohol, poly(ethylene glycol), acrylated epoxy materials, polyethyleneimine, acrylated urethane materials and derivatives and copolymers thereof.

13. The electrochemical cell according to claim 12 wherein said anode layer includes zinc, said cathode layer includes $MnO_2$ and said ionically conductive material comprises KOH.

14. The electrochemical cell according to claim 12 wherein said anode layer includes lead or nickel, said cathode layer includes $PbO_2$, and said ionically conductive material comprises $H_2SO_4$.

15. The electrochemical cell according to claim 12 wherein said anode layer includes an amorphous hydrogen absorbing alloy, said cathode layer includes NiOH and said ionically conductive material comprises KOH.

16. The electrochemical cell according to claim 12 wherein said anode layer includes nickel, said cathode layer includes cadmium oxide and said ionically conductive material comprises KOH.

17. The electrochemical cell according to claim 12 further comprising a current collector adhered to the surface of said cathode layer not contacting said electrolyte layer.

18. The electrochemical cell according to claim 12 wherein said anode layer comprises an active anode material and an electrolyte produced by the process comprising the steps of:

forming a homogeneous mixture of an ionically conductive material, water and a radiation curable material, said radiation curable material being capable of crosslinking upon exposure to ionizing radiation or heat; and subjecting said mixture to ionizing radiation or heat to thereby crosslink said curable material.

19. The electrochemical cell according to claim 18 wherein said anode material further comprises an electrically conductive material.

20. The electrochemical cell according to claim 18 wherein said cathode layer comprises an active cathode material, electrically conductive material and an electrolyte produced by the process comprising the steps of:

forming a homogeneous mixture of an ionically conductive material, water and a radiation curable material, said radiation curable material being capable of crosslinking upon or exposure to ionizing radiation or heat; and subjecting said mixture to ionizing radiation or heat to thereby crosslink said curable material.

21. A process for producing a solid state laminar electrochemical cell having an aqueous electrolyte comprising the steps of:

coating an aqueous electrolyte composition comprising an ionically conductive material, water and a radiation curable material onto an anode composition, said radiation curable material being capable of crosslinking upon exposure to ionizing radiation or heat;

coating a cathode composition onto said electrolyte composition to form a cell assembly; and subjecting said cell assembly to ionizing radiation or heat to crosslink said curable material of said electrolyte.

22. The process according to claim 21 wherein said anode composition comprises an active anode material and an aqueous electrolyte material comprising an ionically conductive material, water and a radiation curable material, said radiation curable material being capable of crosslinking upon exposure to ionizing radiation or heat.

23. The process according to claim 22 wherein said anode composition further comprises an electrically conductive material.

24. The process according to claim 22 wherein said cathode composition layer comprises an active cathode material, an electrically conductive material and an aqueous electrolyte material comprising an ionically conductive material, water and a radiation curable material, said radiation curable material being capable of crosslinking upon exposure to ionizing radiation or heat.

25. The process according to claim 18 wherein said ionically conductive material is an acid or base material or a neutral sale.

26. The process according to claim 25 wherein said ionically conductive material is an acid selected from the group consisting of $H_2SO_4$, $H_3PO_4$, HCl, $HNO_3$ and $HClO_4$.

27. The process according to claim 25 wherein said ionically conductive material is a base selected from the group consisting of KOH, NaOH, LiOH, quaternary ammonium hydroxides and $NH_4Cl$.

28. The process according to claim 25 wherein said curable material is radiation curable and selected from the group consisting of polycarboxylic acids, polyvinyl alcohol, poly(ethylene glycol), acrylated epoxy materials, polyethyleneimine, acrylated urethane materials and derivatives and copolymers thereof.

29. The process according to claim 28 wherein said anode includes zinc, said cathode includes $MnO_2$ and said ionically conductive material comprises KOH.

30. The process according to claim 28 wherein said anode includes lead or nickel, said cathode includes $PbO_2$, and said ionically conductive material comprises $H_2SO_4$.

31. The process according to claim 28 wherein said anode includes an amorphous hydrogen absorbing alloy, said cathode includes NiOH and said ionically conductive material comprises KOH.

32. The process according to claim 28 wherein said anode includes nickel, said cathode includes cadmium oxide and said ionically conductive material comprises KOH.

33. The process according to claim 21 comprising the additional step of adhering a current collector to the surface of said cathode not contacting said electrolyte.

* * * * *

UNITED STATES PATENT AND TRADEMARK OFFICE
CERTIFICATE OF CORRECTION

PATENT NO. : 5,030,527

DATED : July 9, 1991

INVENTOR(S) : Ronald A. Carpio and Denis G. Fauteux

It is certified that error appears in the above-identified patent and that said Letters Patent is hereby corrected as shown below:

Column 3, line 8, cancel "or".

Column 4, line 45, after "LiOH", insert --,--.

Column 5, line 14, change "chloracetic" to --chloroacetic--.

Column 5, line 55, change "conductively" to --conductivity--.

Column 5, line 62, change "be" to --by--.

Claim 25, line 3, change "sale" to --salt--.

Signed and Sealed this

Fifth Day of January, 1993

*Attest:*

DOUGLAS B. COMER

*Attesting Officer*     *Acting Commissioner of Patents and Trademarks*